W. E. COFFIN.
HAND BRAKE MECHANISM.
APPLICATION FILED MAY 7, 1912.

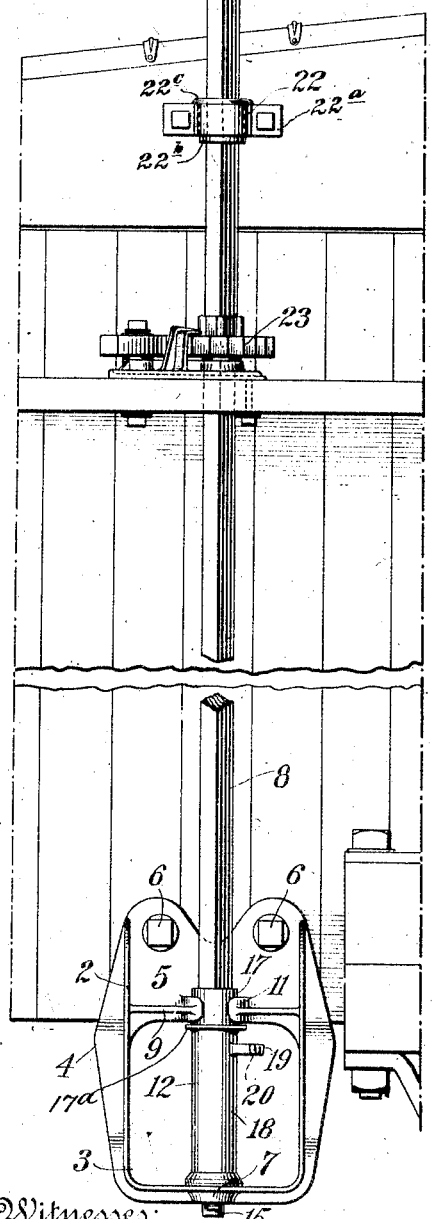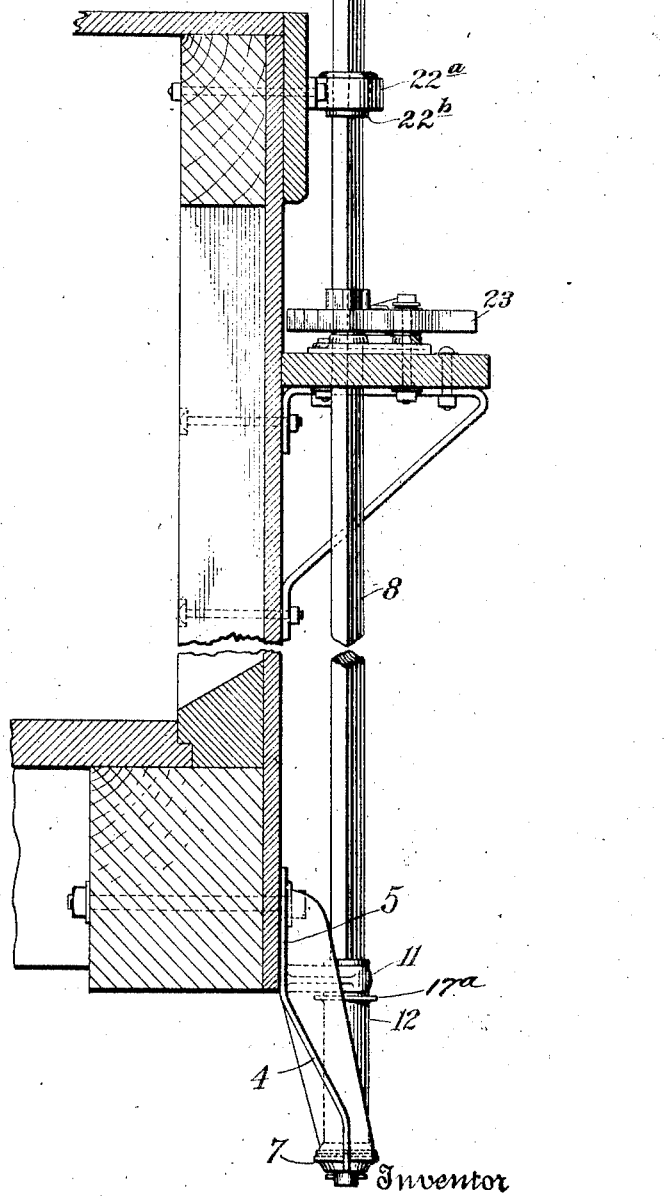

1,098,427.

Patented June 2, 1914.
2 SHEETS—SHEET 2.

Witnesses:
Raphaël Netter
C. D. Morrill

Inventor
Walter E. Coffin
By his Attorney
Clarence Stems

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

HAND BRAKE MECHANISM.

1,098,427.        Specification of Letters Patent.        Patented June 2, 1914.

Application filed May 7, 1912. Serial No. 695,595.

*To all whom it may concern:*

Be it known that I, WALTER E. COFFIN, a citizen of the United States, residing at Cleveland, Cuyahoga county, Ohio, have invented a new and useful Improvement in Hand Brake Mechanisms, of which the following is a full, clear, and exact description, reference being had to the accompanying drawings, forming part of this specification, in which—

Figure 3:
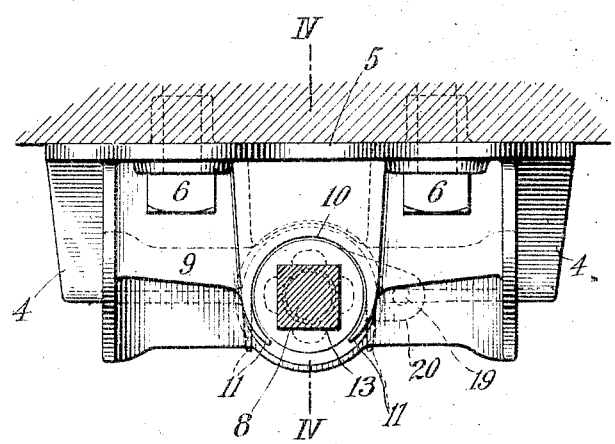
Figure 4:
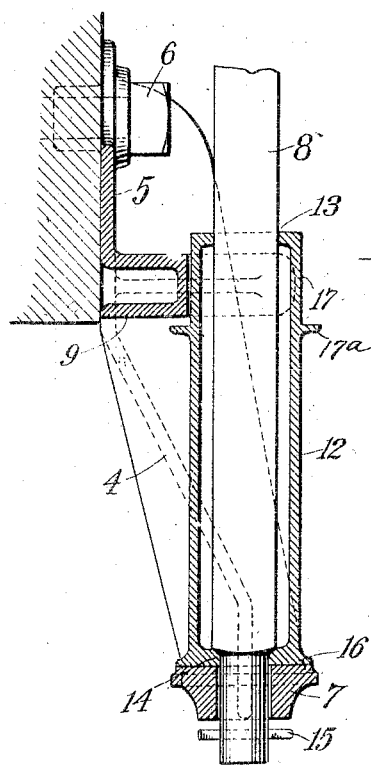
Figure 5:
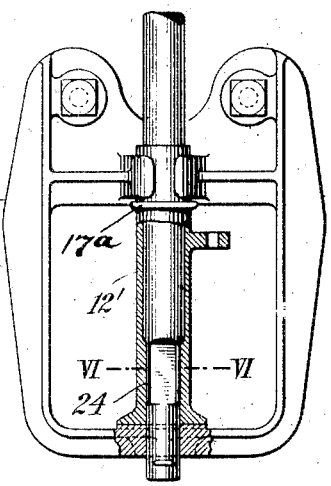
Figure 6:
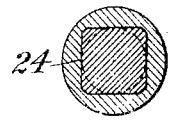

Figure 1 is a front elevation of my invention as applied to a freight car; Fig. 2 is a side elevation of the device; Fig. 3 is a plan of the step with the shaft shown in section; Fig. 4 is a section on the line IV—IV of Fig. 3, and Fig. 5 is a modification thereof. Fig. 6 is a section on line VI—VI of Fig. 5.

My invention relates to hand operated brake mechanisms, and is designed to provide a support for the brake shaft so that this shaft may be readily inserted in or withdrawn from the support, and which when inserted will be securely held therein.

The nature of my invention will be best understood by reference to the accompanying drawings in which 2 represents the brake shaft step, which is preferably made integral, and which has a U-shaped frame 3 reinforced by the webs 4 and a back plate 5. The plate 5 is apertured for the bolts 6 by which the step 2 is attached to the car. At the center of the base of the frame 3 is the reinforcement 7 having a socket therein in which the lower end of shaft 8 is adapted to seat. The plate 5 has near its lower edge a bracket 9 which extends outwardly between the sides of the frame 3 with which it is connected. This bracket 9 has a semi-circular recess 10 of which the center of curvature is directly above the center of the socket 7 and also has the bendable lugs 11 which are shown in dotted lines in Fig. 3 in position for the reception of the sleeve 12.

The shaft 8, which I prefer to make rectangular in cross-section, enters this sleeve 12 through the squared aperture 13, and the lower end of the shaft, which is rounded and of smaller cross-section than the main body of the shaft, passes outwardly through the aperture 14 in the bottom of the sleeve and turns in the socket 7 in which it may be secured by the cotter-pin 15.

The sleeve 12 preferably has a bottom portion 16 adapted to rest on the base of the frame 3, and a collar portion 17 adapted to fit into the recess 10, and an annular flange 17ª intended to underlie the bracket 9 when the sleeve is in normal position and to prevent undue upward movement of said sleeve. The sleeve 12 is secured in the recess 10 by the lugs 11, which are bent around the collar portion 17 thereof, so that while the sleeve 12 is held in position in the step, it is permitted to rotate with the shaft 8. The drum or chain winding portion 18 of the sleeve 12 has a lug 20 preferably cast integral therewith, which is adapted for the attachment of the brake chain thereto, one of the chain links being slipped over the lug 20 and held thereon by a cotter or other securing device passed through the hole 19.

The brake shaft has attached to its upper end the usual hand wheel 21, and may be attached to the upper part of the car by the bracket 22. The bracket 22 is comprised of a strap 22ª which is bolted to the car. Seated within the loop of the strap is a bushing or sleeve 22ᵇ, which forms a bearing for the upper end of the brake shaft and which is adapted to rotate in the loop of the strap. The sleeve or bushing 22ᵇ has a lip or flange 22ᶜ, which bears upon the top surface of the strap 22ª which holds the sleeve in position in the bracket.

23 is a ratchet pawl mechanism by which the brake shaft is locked or released.

In Fig. 5 I show my invention as applied to a round instead of a square shaft. The sleeve 12' is adapted to be rotated by the shaft by means of the rectangularly shaped portion of the sleeve 24 with which portion the squared portion of the shaft co-acts.

It is to be understood that many changes may be made in my device without departing from my invention, since

What I claim is:

1. In a hand brake mechanism, a brake shaft, a brake shaft step having a socket adapted to receive the foot of the brake shaft, a sleeve for the shaft and bendable means for holding the sleeve and the shaft in position in relation to said step.

2. In a hand brake mechanism, a brake shaft, a brake shaft step having a socket adapted to receive the foot of the brake shaft, a sleeve for the shaft, a bearing adapted to engage the sleeve above the drum portion thereof, and bendable means for holding the sleeve and the shaft in position in said bearing.

3. In a hand brake mechanism, a brake shaft, a sleeve on the shaft, a step having a socket adapted to receive the foot of the brake shaft, and bendable lugs adapted to hold the sleeve and the shaft in position in relation to said step when bent about the sleeve.

4. In a hand brake mechanism, a brake shaft and a step therefor, a sleeve rotatably connected with said shaft, and bendable means integral with said step adapted to hold the sleeve and the shaft in position in relation to said step.

5. In a hand brake mechanism, a brake shaft, a sleeve mounted on said brake shaft, and a step having a socket for the foot of the brake shaft, and lugs adapted to be bent around the brake shaft sleeve to hold the sleeve and the shaft in place in relation to the said step.

6. In a hand brake mechanism, a brake shaft, a sleeve mounted thereon and adapted to rotate with said shaft and forming a drum for the brake chain, a U-shaped step having on its base a socket for the shaft, and across its upper portion a bearing member integral therewith and adapted to be bent about said sleeve.

7. In a hand brake mechanism, a brake shaft rectangular in cross-section, a sleeve mounted thereon and adapted to rotate with said shaft and forming a drum for the brake chain, a U-shaped step having on its base a socket for the shaft, and across its upper portion a bearing member integral therewith and adapted to be bent about said sleeve.

8. In a hand brake mechanism, a brake shaft in combination with a brake shaft step, said step comprising a U-shaped member having a socket in its base for the shaft and a plate for attachment to the car, said plate having an outwardly extending portion and lugs thereon adapted to take about the shaft.

9. In hand brake mechanism, an integral stirrup-shaped step having a plate for attachment to the car, a base portion and a semi-circularly recessed portion above said base portion, a sleeve seated on said base portion and having a collar adapted to rest within said recessed portion, and an annular flange upon the sleeve below said collar adapted to coöperate with the semi-circular recessed portion to prevent said sleeve from rising above its normal position upon said step.

10. In a hand brake mechanism, a sleeve comprising a drum winding portion for the brake chain, and being adapted for the reception of a shaft rectangular in cross section in one portion and round in cross section in another portion, the said shaft being apertured for insertion of a retaining pin below the sleeve.

WALTER E. COFFIN.

Witnesses:
HARRY E. ORR,
ARTHUR W. JONES.